United States Patent
Papathanasiou et al.

(10) Patent No.: US 7,295,637 B2
(45) Date of Patent: Nov. 13, 2007

(54) METHOD AND APPARATUS FOR DIVERSITY COMBINING AND CO-CHANNEL INTERFERENCE SUPPRESSION

(75) Inventors: Apostolos Papathanasiou, Ilioupolis (GR); Emmanuel Frantzeskakis, Ilioupolis (GR); Aristidis Posonidis, Holargos (GR); Konstantinos Aretos, AG. Dimitrios (GR)

(73) Assignee: Broadcom Corporation, Irvine, CA (US)

( * ) Notice: Subject to any disclaimer, the term of this patent is extended or adjusted under 35 U.S.C. 154(b) by 664 days.

(21) Appl. No.: 10/286,660

(22) Filed: Nov. 4, 2002

(65) Prior Publication Data

US 2005/0074071 A1 Apr. 7, 2005

(51) Int. Cl.
*H04B 7/10* (2006.01)
*H04L 1/02* (2006.01)

(52) U.S. Cl. .................................. 375/347

(58) Field of Classification Search ................ 375/267, 375/347, 142, 144, 148, 150, 346; 455/501, 455/63.1, 67.13, 296, 114.2, 278.1
See application file for complete search history.

(56) References Cited

U.S. PATENT DOCUMENTS

| | | | |
|---|---|---|---|
| 5,442,661 A * | 8/1995 | Falconer | 370/479 |
| 5,598,428 A * | 1/1997 | Sato | 375/148 |
| 6,577,686 B1 * | 6/2003 | Koga et al. | 375/347 |
| 6,765,969 B1 * | 7/2004 | Vook et al. | 375/259 |
| 2003/0092447 A1 * | 5/2003 | Bottomley et al. | 455/453 |
| 2004/0001556 A1 * | 1/2004 | Harrison et al. | 375/267 |

* cited by examiner

*Primary Examiner*—David C. Payne
*Assistant Examiner*—Aslan Ettehadieh
(74) *Attorney, Agent, or Firm*—McAndrews, Held & Malloy, Ltd.

(57) ABSTRACT

A method and apparatus for controlling an antenna array for wireless communication are described. The method uses the statistical characteristics of the received signal noise in controlling the antenna array in order to achieve directional reception in a wireless communication system and suppress co-channel interference. Furthermore, the method can be used to power space-division multiple access and can be used in conjunction with multi-carrier modulation signaling.

16 Claims, 3 Drawing Sheets

METHOD AND APPARATUS FOR DIVERSITY COMBINING AND CO-CHANNEL INTERFERENCE SUPPRESSION

BACKGROUND OF THE INVENTION (1) Field of the Invention

This invention relates to wireless communications—in particular to diversity combining in a receiver employing an antenna array in order to achieve adaptive directional reception, exploit multi-path signal reception, suppress co-channel interference and allow space division multiplexing.

(2) Brief Description of Related Art

In the area of burst wireless communications the directional signal transmission and reception enhance all the performance metrics of the communication links such as range, throughput rate, emitted signal power, power dissipation, as well as link reliability and interference immunity. Directionality is achieved by employing an antenna array controlled by a beamformer logic at the transmitter site and a signal combiner logic at the receiver site. Antenna arrays can also be coupled with logic for supporting multiple communication links with spatially separated users that share the same spectrum and time frame. For example, spatial division multiple access (SDMA) systems are based on this notion. The above pieces of logic can be modeled in many different ways [1].

However, incorporating high performance adaptation techniques in practical applications is a highly non-trivial task because of the computational complexity factor.

A number of different methods for diversity combining and co-channel interference suppression for wireless burst communications systems have been proposed. However, these methods suffer from one or more weaknesses such as the need of unrealistic modeling assumptions, high computational complexity, slow convergence and the need of coupling with ad-hoc algorithms that alleviate the above.

For example, in [2] the noise power and instant subcarrier energy estimations are used for computing a diversity combiner weight vector in OFDM signaling. In particular, with reference to FIG. 1, a flowchart of operation of this prior art diversity combiner 10 begins with power up block 11. When a symbol 12 is received, the noise power is estimated in block 13 based on some unloaded carriers. For every loaded subcarrier in the said symbol a sequence of five tasks 14 takes place. The subcarrier is received in block 15, its instant energy gets estimated in block 16 and subsequently accumulated to update the subcarrier energy estimation in block 17. Next, the diversity combiner weight vector respective to the said subcarrier gets computed in block 18 on the basis of the subcarrier instant energy, the subcarrier energy estimation and the said noise power. Finally the weight vector is applied in block 19 to the diversity combiner and the data logic level is extracted. The performance of this method depends on the quality of the noise power estimator and consequently the number and structure of the unloaded carriers. In addition, the weights are estimated on the basis of energy measurements only, so the expected quality of performance is poor and therefore an ad-hoc co-phasing algorithm needs to be coupled within the method. Furthermore, this method cannot be used for interference cancellation.

In [3] and [4], two categories of algorithms for diversity combining and co-channel interference suppression are reviewed. In the first category, the direction of arrival (DOA) of the beam needs to be identified at the receiver. This presents many deficiencies. First, DOA estimation is an extremely computation intensive process that cannot be implemented efficiently in the current art of semiconductor technology, thus it cannot find applications in high volume consumer products. Second, the DOA estimation methods are very sensitive to model imperfections such as antenna element intervals and antenna array geometry. Third, the number of antenna elements in the antenna array limits the number of multipaths and interferers DOA based methods can cope with.

In the second category, a training sequence is required along with an estimation of the correlation with this training sequence and the input signal correlations. Although the problems of the algorithms in the previous paragraph are avoided, the need for estimating the correlations of the input signals introduces a slow convergence rate algorithm, especially in relation to multicarrier wireless communication systems. For instance, averaging over a particular subcarrier requires multiple multicarrier symbols.

SUMMARY OF THE INVENTION

An object of this invention is to use the statistical characteristics of the received signal noise in controlling an antenna array in order to achieve directional reception in a wireless communication system. Another object of this invention is to suppress co-channel interference. Still another object of this invention is to power a space-division multiple access wireless communication system.

Here, a method for controlling an antenna array appropriate for burst wireless communications is described. This method exhibits smart antenna characteristics for the receiver including co-channel interference suppression and multi-user support. Also it can be applied in burst wireless systems employing the Orthogonal Frequency Division Multiplexing (OFDM) signaling scheme.

Advantages:
1. Enables non-line of sight communication.
2. Improves the reliability and performance of the wireless communication system in the presence of interference.
3. Exploits spatial diversity in order to support multiple users at the same frequency spectrum and time frame, thus it increases dramatically the communication capacity.
4. Low computational complexity allows the use of this method in devices targeting the consumer market.
5. Fast convergence.
6. No assumption of the statistical characteristics of the signal or the channel is necessary.
7. No assumption about the antenna array geometry is necessary, while the method is immune to antenna element placement and element interval inaccuracies.

DETAILED DESCRIPTION OF THE INVENTION

Figure 1:
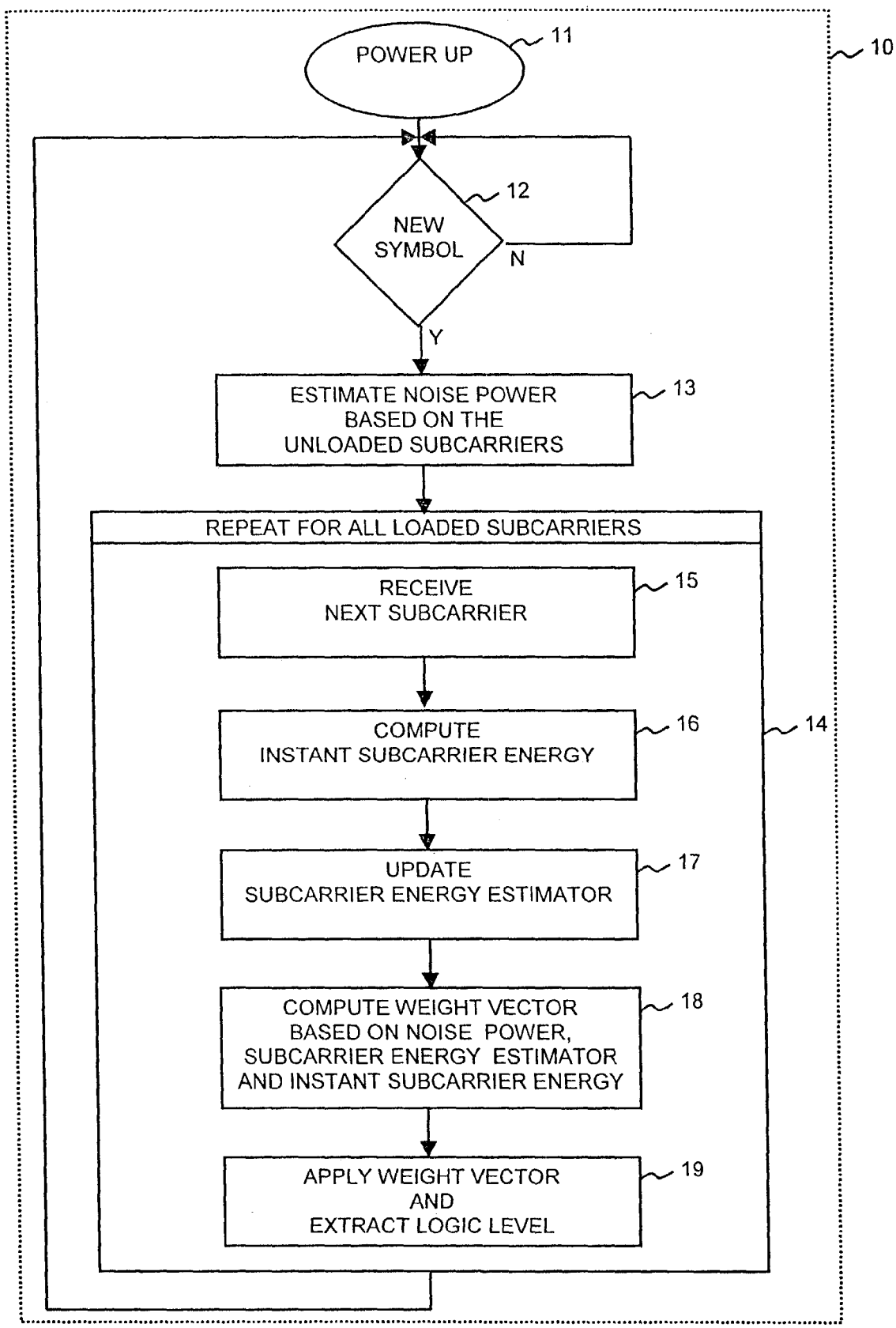
FIG. 1 shows the flowchart of operation of prior art diversity combining
Figure 2:
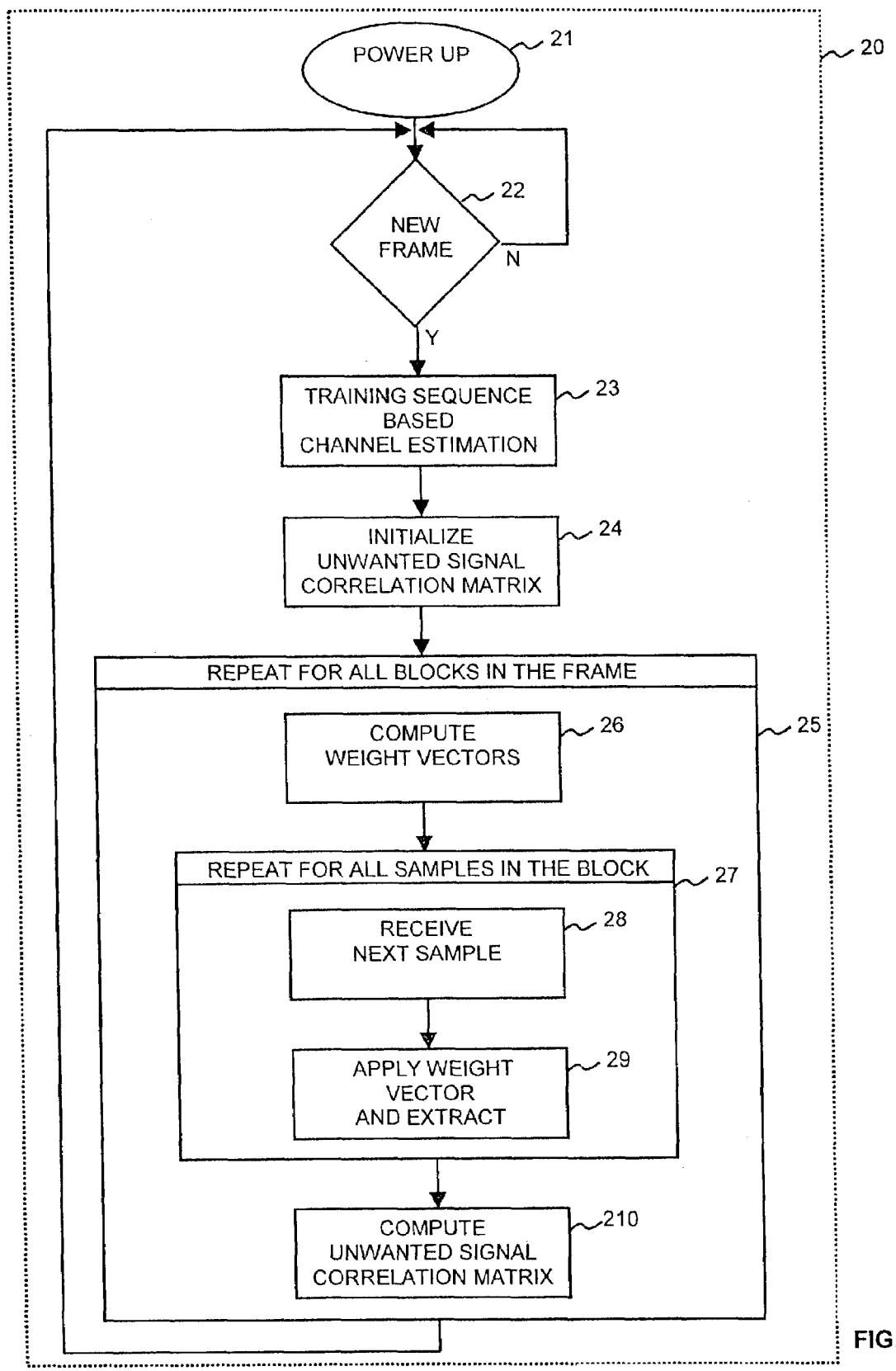
FIG. 2 shows the flowchart of operation for diversity combining and co-channel interference suppression according to the invention

With reference to FIG. 2, a flowchart of operation of a diversity combiner 20 in accordance with a preferred embodiment of the present invention is used by a receiver coupled to receive a plurality of K input signals using an antenna array. Each signal consists of a useful information signal and an additive unwanted signal. The unwanted signal contains additive noise, usually referred to as Additive White Gaussian Noise (AWGN) in wireless communications, and may additionally contain one or more interferer signals possibly of the same structure as the useful information signal. Each input signal is characterized by a frame including a sequence of data blocks, said frame comprising a known training data block sequence and an information data block sequence, each of said training and information sequences including at least one data block, each data block including N samples. The flowchart begins with power up in block 21. When a new frame is received in block 22, the channel vectors $H_n$, n=1,2, ..., N are estimated in block 23 based on the received training sequence, where each channel vector has size 1×K. Then, the correlation matrix R of the said unwanted signal is initialised in block 24 to the identity matrix $I_K$ of size K×K. For each block in the frame 25 the diversity combining weight vectors $W_n$, n=1,2, ..., N each one of size K×1 are computed in block 26 based on the channel estimate and the said correlation matrix R of the unwanted signal. Each vector $W_n$ is the solution to the following minimization problem:

$$\text{Minimize } W_n^{*T}RW_n \tag{1}$$

$$\text{Subject to } H_nW_n=1 \tag{2}$$

that is:

$$W_n=(H_nR^{-1}H_n^{*T})^{-1}R^{-1}H_n^{*T}, n=1, \ldots, N \tag{3}$$

where "T", "*" and "−1" denote matrix transposition, conjugation and inversion respectively.

Then, for each sample n=1,2, ..., N in the block 27 a sequence of two tasks takes place. First, an input sample vector $E_n$ of size 1×K is received in block 28. Second, the weight vector $W_n$ is applied to the input sample vector $E_n$ and the logic level is extracted in block 29:

$$d_n=\text{quantize}(E_nW_n). \tag{4}$$

The said unwanted signal is defined by:

$$U_n=(E_n-dH_n)^{*T}. \tag{5}$$

Finally, the said correlation matrix R of the unwanted signal is computed 210 by:

$$R = \sum_{n=1}^{N} U_n U_n^{*T}. \tag{6}$$

The flowchart described above is appropriate both for directional reception and co-channel interference (CCI) suppression.

The computation of the inverse $R^{-1}$ of the correlation matrix R can be obtained by direct matrix inversion or with an iterative method, for example by using the matrix inversion lemma:

$$G_0 = \frac{1}{\delta}I_K \tag{7}$$

$$G_n = G_{n-1} - G_{n-1}U_n(1+U_n^{*T}G_{n-1}U_n)^{-1}U_n^{*T}G_{n-1}, n = 1, \ldots, N$$

$$R^{-1} = G_N$$

where δ is a small positive number.

Another preferred embodiment of the present invention comprises an antenna array of L antenna elements grouped in M sub-arrays of K elements each one. Each antenna sub-array of the plurality of M sub-arrays is coupled to feed a diversity combiner 20. The $m^{th}$ diversity combiner 20, where m ranges in 1, 2, ..., M, at the $n^{th}$ time instant produces a soft logic level $d_{n,m}$ following for example the steps described with reference to FIG. 2. An output logic level $d_n$ is produced on the basis of the soft logic levels $d_{n,m}$, m=1, 2, ..., M. This can be obtained by means of averaging of the soft logic levels, or selecting one soft logic level by using some criterion, or by means of maximal ratio combining with respect to channel measurements.

Figure 3:
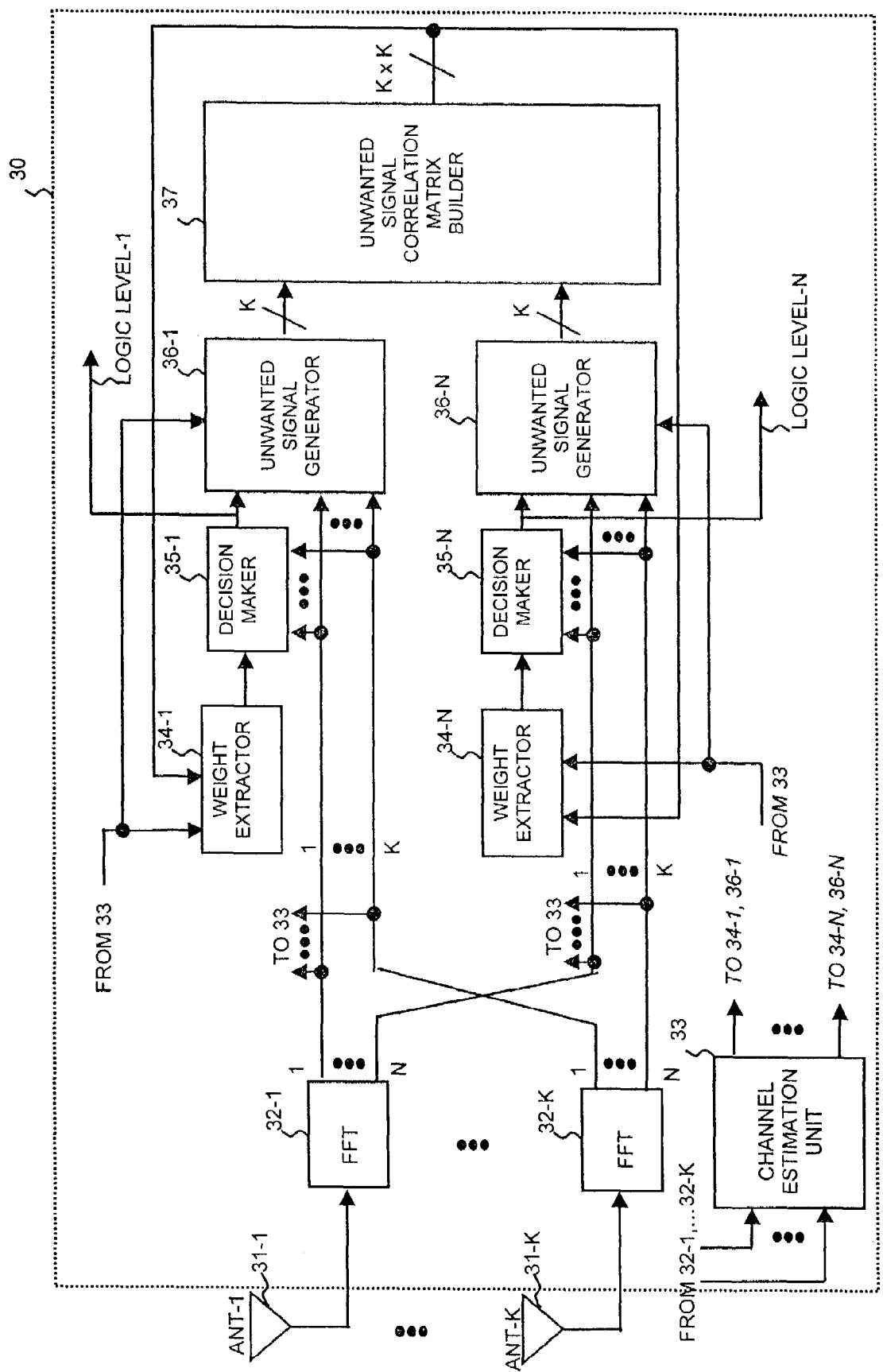
FIG. 3 shows a multi-antenna receiver according to the invention

With reference to FIG. 3, a multi-antenna receiver 30 in accordance with a preferred embodiment of the present invention comprises an OFDM diversity combiner. An antenna array of K antenna elements 31-1 to 31-K generates K samples for each subcarrier in an OFDM symbol of size N. The antenna elements provide input to K fast Fourier transform (FFT) processors 32-1 to 32-K Each of the FFT processors produces N frequency samples $E_{nk}$, n=1, 2, ..., N for each OFDM symbol. The produced frequency domain content is fed to a Channel Estimation Unit 33 that computes the channel response $H_{nk}$ for each antenna element k and each subcarrier n on the basis of a sequence of training symbols:

$$H_{nk} = \frac{1}{c_n}E_{nk}, k = 1, \ldots, K, n = 1, \ldots, N \tag{8}$$

where $c_n$, n=1, 2, ..., N denote the noise free, real valued transmitted carriers of a training symbol. If the training sequence employs more than one training symbols, the channel response can be computed by means of averaging. The produced estimates are fed to N Weight Extractor units 34-1 to 34-N. The $n^{th}$ Weight Extractor unit, receives also as input the unwanted signal correlation matrix R and produces the weight vector $W_n$ according to equation (3). The produced outputs are fed to N Decision Making units 35-1 to 35-N. The $n^{th}$ Decision Making unit receives also as input the $n^{th}$ output from each FFT and it produces a logic level according to equation (4), where $$E_n=[E_{n1}E_{n2} \ldots E_{nK}], n=1, \ldots, N.$$

The logic levels are fed to N Unwanted Signal Generator units 36-1 to 36-N. The $n^{th}$ Unwanted Signal Generator unit receives also as input the $n^{th}$ output from each FFT and it produces a column vector of length K according to equation (5), where $$H_n=[H_{n1}H_{n2} \ldots H_{nK}], n=1, \ldots, N.$$

The outputs of the Unwanted Signal Generator units are fed to the Unwanted Signal Correlation Matrix Builder 37 that performs equation (6), produces the inverse of matrix R and feeds it back to the Weight Extractor units 34-1 to 34-N.

Note that in (6) matrix R is computed on the basis of the sub-carriers of one OFDM symbol. However, R can also be computed using the sub-carriers of two or more consecutive symbols.

The output of the diversity combiner 30 comprises the logic levels produced by the Decision Making units 35-1 to 35-N, as well as the weight vectors produced by the Weight Extractor units 34-1 to 34-N. In a Time Division Duplex (TDD) system these weight vectors can be used by the transmitter for the purpose of beamforming.

In another preferred embodiment of this invention, the channel estimates are updated in the Channel Estimation Unit 33 on the basis of the received data (4). An exemplary update algorithm is given below:

$$H_n^{new} = (1-\alpha)H_n^{old} + \alpha \frac{1}{\hat{d}_n} E_n, n = 1, \ldots, N \quad (9)$$

where $\alpha$ is a number in the range (0,1).

In another preferred embodiment of the multi-antenna receiver 30 according to the present invention the weight vectors $W_n$, n=1, 2, . . . , N are computed by $$W_n = B_n Z, n=1, \ldots, N \quad (10)$$

where $B_n$, n=1, 2, . . . , N are diagonal matrices of size K×K $$B_n = \begin{bmatrix} H_{n1}^*/|H_{n1}|^2 & & 0 \\ & \ddots & \\ 0 & & H_{nK}^*/|H_{nK}|^2 \end{bmatrix}, n = 1, \ldots, N, \quad (11)$$

and the length K column vector Z is the solution to the following minimization problem $$\text{Minimize } Z^{*T}PZ \quad (12)$$

$$\text{Subject to } 1_K Z=1 \quad (13)$$

where $1_K$ is a row vector of size K with unit elements, P is a matrix of size K×K $$P = \sum_{n=1}^{N} V_n V_n^{*T}, \quad (14)$$

$V_n, n = 1, \ldots, N$ is $$V_n = B_n^* U_n, n = 1, \ldots, N \quad (15)$$

and $U_n$ is determined as in equation (5).

Note that the minimization problem (12)-(13) can be solved by using a least squares algorithm such as the RLS algorithm.

In another preferred embodiment of the multi-antenna receiver 30, the weight vectors are computed on the basis of (10) where vector Z is the solution to the minimization problem (12)-(13) and at the same time it satisfies an inequality constraint (16)

$$Z^{*T}Z \leq \gamma \quad (16)$$

for some positive constant $\gamma$. In this way, the dynamic range of the weight vector is better controlled.

The receiver 30 takes a fully parallel design approach. Alternatively, eg units 34-1 to 34-N can be replaced by a single unit that is able to produce an output at a higher rate, eg N times faster. Such serialization approach can be followed for implementing any unit appearing in multiple copies in FIG. 3. Furthermore, the described method can be applied coupled with any discrete data transformer in place of the FFT, such as the Discrete Sine Transform, Discrete Cosine Transform, Discrete Wavelet Transform, etc.

The multi-antenna receiver 30 can be adapted for use in a single carrier communication system according to the present invention by avoiding the quantization function in the Decision Making Units 35-1 to 35-N and feeding the produced N soft logic levels to an inverse fast Fourier transformer. The output N time-domain soft logic levels are then quantized to produce the desired hard logic levels.

Another preferred embodiment of the diversity combiner according to the present invention concerns a receiver serving a number of J simultaneous communication links sharing the same frequency spectrum or overlapping frequency spectrums. The objective of this embodiment is to support multiple communication links with spatially separated users that share essentially the same spectrum and time frame. For example, spatial division multiple access (SDMA) systems are based on this notion. The receiver is equipped with an antenna array of K elements and employs symbols of N subcarriers.

The method described below assumes that the receiver knows the channel characteristics of the J different communication links. This information for example can be extracted by means of training sequences respective to the different links that are transmitted at distinct time intervals. In particular, if the receiver is used in a multi-carrier signal communications system, the frequency responses associated to the J communication links can be computed as follows:

$$H_n^{(j)} = [H_{n1}^{(j)} H_{n2}^{(j)} \ldots H_{nK}^{(j)}], n = 1, \ldots, N, j = 1, \ldots, J$$

where $$H_{nk}^{(j)} = \frac{1}{c_n^{(j)}} E_{nk}^{(j)}, k = 1, \ldots, K, n = 1, \ldots, N, j = 1, \ldots, J$$

and $C_n^{(j)}$, n=1, . . . , N represents the $j^{th}$ communication link training sequence and $E_{nk}^{(j)}$, n=1, . . . , N represents the corresponding frequency domain sample received at the $k^{th}$ antenna.

The data symbols are transmitted simultaneously implying that a received frequency domain data sample $E_n$ carries information from J different sources, where $E_n$ is a row vector of length K as described with reference to FIG. 3. The distinct weight vectors $W_n^{(j)}$ respective to the $j^{th}$ communication link, j=1, . . . , J, can be stacked together in a matrix $W_n$ of size K×J:

$$W_n = [W_n^{(1)} W_n^{(2)} \ldots W_n^{(J)}], n=1, \ldots, N \quad (17)$$

Similarly, let $H_n$ denote the J×K matrix $$H_n = [H_n^{(1)T} H_n^{(2)T} \ldots H_n^{(J)T}]^T, n=1, \ldots, N \quad (18)$$

and $d_n$ denote the vector of size 1×J of the multiple logic levels respective to the multiple communication links:

$$d_n = [d_n^{(1)} d_n^{(2)} \ldots d_n^{(J)}], n=1, \ldots, N$$

Also, let the unwanted signal $U_n$ be $$U_n = (E_n - d_n H_n)^{*T}, n=1, \ldots, N$$

and the correlation matrix R defined as in equation (6). Consider the following minimization problem:

Minimize $W_n^{*T} R W_n$ (19)

Subject to $H_n W_n = I_J$ (20)

The solution in this problem is:

$$W_n = R^{-1} H_n^{*T} (H_n R^{-1} H_n^{*T})^{-1}, n=1, \ldots, N \quad (21)$$

For each input sample vector $E_n$, $n=1,2,\ldots,N$ the multiple logic levels are jointly detected as follows:

$d_n = \text{quantize}\{E_n W_n\}$ (22)

It deserves noting that in order to avoid the non-singularity of the size J×J matrix $(H_n R^{-1} H_n^{*T})$, the number K of antenna elements should be greater or equal to the number J of communication links. Furthermore, the noise correlation matrix R is common for the evaluation of all J weight vectors (17). Consequently, only one matrix inversion is required for all J communication links. Furthermore, this inversion can be calculated recursively in N steps by using for example the matrix inversion lemma.

In another preferred embodiment of the present invention concerning a diversity combiner that serves a number of J simultaneous communication links sharing the same frequency spectrum, the distinct weight vectors $W_n^{(j)}, j=1, \ldots, J$, are computed independently on the basis of $$W_n^{(j)} = (H_n^{(j)} R^{-1} H_n^{(j)*T})^{-1} R^{-1} H_n^{(j)*T}, n=1, \ldots, J \quad (23)$$

where R is a correlation matrix defined as in (6) with unwanted signal $U_n$ defined as:

$$U_n = \left( E_n - \sum_{j=1}^{J} H_n^{(j)} \hat{d}_n^{(j)} \right)^{*T} \quad (24)$$

and logic levels:

$\hat{d}_n^{(j)} = \text{quantize}\{d_n^{(j)}\}, j=1, \ldots, J$ (25)

The quantities $d_n^{(j)}$, $j=1, \ldots, J$ are the solution of the linear system of J equations with J unknowns $$d_n^{(j)} = \left( E_n - \sum_{\substack{i \\ i \neq j}} H_n^{(i)} \hat{d}_n^{(j)} \right)^* W_n^{(j)}, j = 1, \ldots, J. \quad (26)$$

Solving (26), substituting in (25) and stacking together the logic levels respective to the multiple communication links we get:

$d_n = \text{quantize}\{E_n W_n (H_n W_n)^{-1}\}$ (27)

where $W_n$ is defined in formula (17) and its columns are computed on the basis of (23).

In another preferred embodiment of the present invention a diversity combiner serves multiple communication links that are categorized according to their received signal strength, while the logic levels associated to the communication links of each category are computed in parallel and the processing respective to different categories takes place in a serial manner. The categorization can take place on the basis of a training signal. For example, for two categories of $J_1$ high strength signals and $J_2$ low strength signals, where $J_1 \geq 1$ and $J_2 \geq 1$, the logic levels $\hat{d}_n^{(j)}, j=1, \ldots, J_1$ are determined by using (22) or (27) and taking into account only these $J_1$ high strength signal links while the $J_2$ low strength signals contribute in the unwanted signal. Subsequently, the logic levels $\hat{d}_n^{(j)}, j=J_1+1, \ldots, J_1+J_2$ are determined using (22) or (27) where the input sample vector $E_n$ is substituted by the modified sample vector $$E_n^2 = E_n - \sum_{j=1}^{J_1} \hat{d}_n^{(j)} H_n^{(j)}$$

and only the $J_2$ low strength signal links are taken into account. The objective of this embodiment is to reduce the computational complexity of solving equation (27) or address cases where the strengths of the received signals exhibit large differences. This embodiment of the invented method can be activated in real time after the received signal strength measurements become available.

In the above descriptions of the preferred embodiments of diversity combiners each one of the weight vectors for one communication link is determined on the basis of one associated input sample vector. However, the method of the present invention can also be adapted for determining one weight vector on the basis of two or more consecutive input sample vectors. Also, the method of the present invention can be used for determining two or more weight vectors associated to consecutive input sample vectors on the basis of these consecutive input sample vectors. In particular, for the case of multi-carrier communication systems, blocks of consecutive sub-carriers in consecutive symbols can be grouped together for computing the respective combining weight vectors. These adaptations of the invented method serve two purposes. First, to exploit the statistical dependences among input sample vectors for the benefit of interference cancellation. Second, to control the computational complexity of the method.

The invention claimed is:

1. A method for processing a received wireless signal, the method comprising:
   computing at least one diversity combining weight vector for each of a plurality of information data blocks within the received wireless signal based on at least one correlation estimate of an unwanted signal component within the received wireless signal, and at least one channel response of an antenna array used for receiving the wireless signal;
   determining at least one input logic level of the received wireless signal based on said computed at least one diversity combining weight vector; and
   for each of said plurality of information data blocks, determining a correlation matrix of said unwanted signal component based on said at least one input logic levels and said at least one channel response, to process the received wireless signal.

2. The method of claim 1, wherein the received wireless signal comprises a sequence of information data blocks and wherein each data block comprises a plurality of samples.

3. The method of claim 1, wherein the received wireless signal comprises one or more of the following: an orthogonal frequency division multiplexing (OFDM) symbol and a multicarrier modulated symbol.

4. The method of claim 1, comprising initializing said at least one correlation estimate of said unwanted signal component to memory stored values.

5. The method of claim 4, wherein said at least one correlation estimate of said unwanted signal component comprises at least one of the following: an auto-correlation and a cross-correlation, and wherein said auto-correlation is assigned a unit value and said cross-correlation is assigned a zero value.

6. The method of claim 1, wherein said computing of said at least one diversity combining weight vector uses a recursive least squares algorithm.

7. The method of claim 1, wherein the received wireless signal comprises at least one sequence of training data blocks respective to at least one transmitter device, each sequence of training data blocks carrying information from only one transmitter device, wherein said at least one sequence of training data blocks are used for estimating said at least one channel response of said antenna array.

8. The method of claim 7, comprising updating said at least one channel response of said antenna array based on the determined at least one input logic level.

9. A system for processing a received wireless signal, the system comprising:
   circuitry that computes at least one diversity combining weight vector for each of a plurality of information data blocks within the received wireless signal based on at least one correlation estimate of an unwanted signal component within the received wireless signal, and at least one channel response of an antenna array used for receiving the wireless signal;
   said circuitry determines at least one input logic level of the received wireless signal based on said computed at least one diversity combining weight vector; and
   said circuitry determines a correlation matrix of said unwanted signal component for each of said plurality of information data blocks, based on said at least one input logic level and said at least one channel response, to process the received wireless signal.

10. The system of claim 9, wherein the received wireless signal comprises a sequence of information data blocks and wherein each data block comprises a plurality of samples.

11. The system of claim 9, wherein the received wireless signal comprises one or more of the following: an orthogonal frequency division multiplexing (OFDM) symbol and a multicarrier modulated symbol.

12. The system of claim 9, wherein said circuitry initializes said at least one correlation estimate of said unwanted signal component to memory stored values.

13. The system of claim 9, wherein said at least one correlation estimate of said unwanted signal component comprises at least one of the following: an auto-correlation and a cross-correlation, and wherein said auto-correlation is assigned a unit value and said cross-correlation is assigned a zero value.

14. The system of claim 9, wherein said computing of said at least one diversity combining weight vector uses a recursive least squares algorithm.

15. The system of claim 9, wherein the received wireless signal comprises at least one sequence of training data blocks respective to at least one transmitter device, each sequence of training data blocks carrying information from only one transmitter device, wherein said at least one sequence of training data blocks are used for estimating said at least one channel response of said antenna array.

16. The system of claim 15, wherein said circuitry updates said at least one channel response of said antenna array based on the determined at least one input logic level.

* * * * *